United States Patent [19]
Oligschlaeger

[11] Patent Number: 5,911,363
[45] Date of Patent: Jun. 15, 1999

[54] VEHICLE MOUNTED SPRAY APPARATUS AND METHOD

[75] Inventor: Fred Oligschlaeger, Bothell, Wash.

[73] Assignee: Spratronics, Inc., Bothell, Wash.

[21] Appl. No.: 08/814,288

[22] Filed: Mar. 10, 1997

[51] Int. Cl.$^6$ .................................................. B05B 9/06
[52] U.S. Cl. ............................................ 239/11; 239/155
[58] Field of Search .............................. 239/533.1, 118, 239/104, 452, 459, 156, 757, 172, 11, 5, 1

[56] References Cited

U.S. PATENT DOCUMENTS

| | | | |
|---|---|---|---|
| 868,715 | 10/1907 | Skinner | 239/521 |
| 2,141,360 | 12/1938 | Ottajovits | 158/75 |
| 2,186,216 | 1/1940 | Smith | 299/107.5 |
| 2,614,885 | 10/1952 | Roell et al. | 239/118 |
| 2,766,064 | 10/1956 | Schweitzer | 239/533.1 X |
| 2,845,306 | 7/1958 | Carver | 239/533.1 X |
| 2,913,187 | 11/1959 | Anderson | 239/533.1 X |
| 3,204,873 | 9/1965 | Senninger | 239/118 X |
| 3,227,378 | 1/1966 | Stewart | 239/412 |
| 3,233,832 | 2/1966 | Hallberg | 239/155 |
| 3,255,974 | 6/1966 | Roosa | 239/533 |
| 3,344,993 | 10/1967 | Wilder et al. | 239/164 |
| 3,398,936 | 8/1968 | Delano | 239/533 |
| 3,434,667 | 3/1969 | Chmura | 239/533 |
| 3,499,605 | 3/1970 | Dreisin | 239/86 |
| 3,529,772 | 9/1970 | Broderson | 239/157 |
| 3,589,612 | 6/1971 | Shaffer | 239/139 |
| 3,670,962 | 6/1972 | Johnston | 239/62 |
| 4,019,685 | 4/1977 | Tangeman et al. | 239/156 |
| 4,322,034 | 3/1982 | Fox | 239/155 |
| 4,524,914 | 6/1985 | Kaibara et al. | 239/452 |
| 4,714,196 | 12/1987 | McEachern et al. | 239/156 X |
| 4,817,870 | 4/1989 | Dalton | 239/157 |
| 5,035,357 | 7/1991 | Brickell et al. | 239/156 |
| 5,129,580 | 7/1992 | Schmitter | 239/533.1 X |

FOREIGN PATENT DOCUMENTS

| 91209 | 3/1896 | Germany | 239/118 |
|---|---|---|---|

*Primary Examiner*—Kevin Weldon
*Attorney, Agent, or Firm*—Dowrey & Associates

[57] ABSTRACT

A vehicle mounted spray system includes a variable orifice spray nozzle and control apparatus to correlate the delivery of pressurized fluid spray product to the nozzle in a selected ratio to the ground speed of the vehicle. The spray nozzle includes a circular orifice with a conical valve seat and a fluid pressure responsive, spring biased, conical shaped needle valve element mounted for reciprocation therein. The taper of the valve element is less than the taper of the valve seat and the apex of the needle valve protrudes beyond the orifice to create a solid stream flow of the spray product. The solid stream spray is projected onto the surface traveled in a direction opposite the direction of travel and at an angle therewith. The nozzle velocity of the spray product is equal to or greater than the vehicle velocity.

36 Claims, 4 Drawing Sheets

VEHICLE MOUNTED SPRAY APPARATUS AND METHOD

BACKGROUND OF THE INVENTION

1. Field of the Invention

The present invention relates to a vehicle mounted spraying system and a method of accurately controlling the point of application, spray pattern and area of coverage by use of a solid stream producing nozzle to direct the flow of the product being dispensed. More particularly the apparatus includes a pump for discharging the product, the pump being driven at a speed correlated to the ground speed of the vehicle and responsive to a setable product application rate. The product is delivered through a novel discharge nozzle so as to maintain a constant solid stream spray pattern and density of product applied to a surface, irrespective of the vehicle speed. A fluid pressure responsive variable orifice discharge nozzle is utilized to produce a solid stream of product which may be precisely aimed and projected in such a manner as to provide preset uniform coverage for a wide area beyond the lane of traffic occupied by the vehicle and over a wide range of vehicle speeds and product application rates.

2. Description of the Prior Art

Vehicle mounted spray systems for applying fluid products to road or ground surfaces are well known in the prior art including various devices for synchronizing the application rate and spray pattern of a fluid with the speed of the vehicle upon which the system is mounted. Systems of this type, however, normally utilize fixed orifice spray nozzles which impose severe limitations on the operating ground speed range at which the chosen product application rate can be suitably maintained. If the operating ground speed at which spaying is to be accomplished is 50 miles per hour for instance, the minimum speed at which suitable product application at any chosen application rate per lane mile could be expected would be approximately 25 miles per hour. If a different product application rate is desired it is, of course, necessary to replace all of the fixed orifice nozzles to attain the new application rate for the stated speed range.

Since the nozzle pressure for any given size orifice increases by the square of the ground speed increase, a nozzle capable of maintaining a given spread rate at a low ground speed becomes inoperative at higher speeds because of the exponentially increased nozzle pressures. As an example, the following chart shows the nozzle pressure characteristic of a 0.016" orifice set for a spread rate of 30 gallons per lane mile (GPLM):

| Ground Speed MPH | Nozzle Orifice PSI | Nozzle Flow Rate GPM |
|---|---|---|
| 1 | 20 | ⅛ |
| 2 | 80 | ¼ |
| 4 | 320 | ½ |
| 8 | 1,280 | 1 |
| 16 | 5,120 | 2 |
| 32 | 20,480 | 4 |
| 64 | 81,920 | 8 |

If the spread rate is increased to 60 GPLM for the same size orifice, the following pressures result:

| Ground Speed MPH | Nozzle Orifice PSI | Nozzle Flow Rate GPM |
|---|---|---|
| 1 | 80 | ¼ |
| 2 | 320 | ½ |
| 4 | 1,280 | 1 |
| 8 | 5,120 | 2 |
| 16 | 20,480 | 4 |
| 32 | 81,920 | 8 |
| 64 | 327,680 | 16 | as these figures demonstrate, the nozzle pressures for a fixed orifice capable of operating at low speeds become prohibitively high at higher speeds.

For effective roadway spraying the system must operate over a very wide range of ground speeds e.g. 0–50 mph, as for instance between an intersection and open road. Fixed orifice nozzle systems for roadway spraying are thus generally inadequate because of the limited ground speed spraying range and the necessity for changing multiple nozzles when a different spread rate is desired.

In most prior art systems, a fluid pump for delivering the liquid product is normally driven by some form of motor means such as an hydraulic or electrical motor, or an internal combustion engine with various known means being utilized to control the speed of the pump drive motor relative to the ground speed of the vehicle in order to maintain a constant ratio, determined by the desired product spread rate. Thus, the amount of product delivered is increased in correlation to the increased speed of the vehicle to maintain the chosen spread rate. U.S. Pat. No. 4,019,685 to Tangeman et al shows such a system wherein the correlation between vehicle ground speed and the volume of liquid product delivered is accomplished with a fully mechanical control device specifically involving a cam-type drive apparatus. Although the Tangemen et al disclosure does not include the description of a liquid spray nozzle system for dispensing the liquid product, fixed orifice nozzles are usually utilized to apply the product. The product is applied directly to the ground or road surface in a vertical direction, either from the front or rear end of the vehicle, in an atomized spray pattern with the limitations discussed.

U.S. Pat. No. 4,817,870 to Dalton discloses a system for maintaining a constant application rate by automatically controlling the discharge rate of a liquid product delivery pump utilizing an electronic control apparatus. The control apparatus automatically adjusts the drive ratio of a hydrostatic transmission in response to operator-selected changes in the length of the spray bar. The Dalton patent illustrates the typical vertically directed, fixed orifice spray nozzle arrangement. A plurality of nozzles are typically arranged on a transverse spray bar. The main spray bar covers the travel lane of the vehicle and additional spray bars extend laterally to cover additional areas on each side of the vehicle.

In addition to the speed synchronized spray applicators discussed, U.S. Pat. No. 3,344,993 to Wilder et al discloses an additional feature wherein the size of the spray nozzle orifice is controlled responsive to the delivery pump speed and quantity of product delivered. Thus, as the line pressure increases the orifice size increases. A uniform product spray rate or pattern results since the velocity of the material discharged at the orifice also increases with ground speed to increase the nozzle flow rate. In this patent, the nozzle opening or orifice is controlled by a mechanical linkage which is responsive to a bellows device subject to the fluid pressure in the product delivery line. The type of nozzle used in the Wilder et al patent is a simple orifice and deflection plate which directs the fluid product downwardly onto the traveled surface directly in the rear of the vehicle. The nozzle of the Wilder et al device, however, is a mechanically operated rotary regulator which produces an atomized discharge, such as used to spray a liquid onto a particulate base. The orifice configuration is not designed for high pressure, high speed spraying or to produce a high pressure solid stream liquid spray at any speed. Additionally, this device depends upon a mechanical linkage for operating each individual nozzle regulator. The exposed mechanical linkage is therefor subject to frequent damage and malfunction in a hostile environment. With this arrangement, a malfunction in the linkage of only one nozzle has the potential of affecting all nozzles since they are connected to a common mechanical operator link or bar.

The patent to Broderson U.S. Pat. No. 3,529,772 discloses a speed compensated water sprinkler system for water tank vehicles utilizing an adjustable spray nozzle which produces a wide-arc horizontal spray. A spring biased deflector plate operates to vary the size of the sprinkler orifice in proportion to the pressure of the water supply. In this manner not only the pattern covered by the water spray but also the density of the water applied to the ground remain substantially constant within a designed speed range of the vehicle. In the Broderson system, either a hydraulic motor, an internal combustion engine or an electrical motor, the speed of which is controlled responsive to the vehicle ground speed, is used to vary the output of the delivery pump for the sprayed product.

The following listed patents all disclose various means of controlling the output of fixed orifice discharge nozzles by controlling the quantity and pressure of the liquid product delivered to the fixed nozzle.

| U.S. Pat. No. | Patentee |
|---|---|
| 3,233,832 | Hallberg |
| 3,670,962 | Johnston |
| 4,322,034 | Fox |
| 5,035,357 | Breckell et al |

SUMMARY OF THE INVENTION

The present invention provides a vehicle mounted fluid spray apparatus for pavement or general purpose ground spraying in which the supply of product to be sprayed is delivered in proportion to the vehicle's speed within a wide range of vehicle speeds and setable product application rates. A fluid pressure responsive variable orifice nozzle with calibrated minimum and maximum operating range is utilized to control the velocity of the product delivered and the nozzle discharge pressure to thereby deliver the same density or volume of product dispensed per lineal foot over a prescribed pattern throughout the range of vehicle speeds. The variable orifice nozzle is of the type which delivers a solid stream or jet of unatomized fluid and, in the present preferred embodiment, comprises a spring biased conical shaped needle which throttles the fluid flow in a circular orifice within an orifice element having a conical seat surrounding the needle.

The conical needle not only controls the nozzle discharge pressure but also the size of the orifice and hence the volume of fluid allowed to pass through the orifice. The nozzle configuration also acts to shape the fluid discharged into a solid stream which is projected beyond the nozzle orifice. A novel spray pattern is utilized wherein the solid stream of product is projected rearwardly a desired distance beyond the air turbulence immediately behind the moving vehicle. Solid streams of product may thus be projected in a pattern to the rear of the vehicle as well as on either side so as to effectively and efficiently cover three traffic lanes at accelerated speeds. The ability to project and accurately direct solid streams of product results from the high velocity of the fluid stream exiting from the orifice which increases with increased nozzle pressure and vehicle ground speed. To achieve this, the velocity of the product dispensed is maintained equal to or greater than the forward velocity of the vehicle which, when spraying in the opposite direction to travel, is referred to in the art as zero-velocity spraying. While provisions are made for controlling the spread angle of the stream of product being discharged, and thus the spray pattern, the spray remains a solid stream designed to impact the surface treated and to spread over a predetermined splash pattern after impact.

DESCRIPTION OF THE PREFERRED EMBODIMENT

Although the present invention will be described with reference to its application in the spraying of liquid anti-icing/de-icing products such as magnesium chloride to highway surfaces, it will be understood that the invention, both apparatus and method, is not limited to this application or any particular product. Other applications of the apparatus and method include but are not limited to the spraying of fluid products on airport runways, taxiways and ramps; roadside herbicide spraying; dust control; road subsoil and ground surface stabilization; and street flushing by way of example. Likewise, the spray apparatus and method is not limited to any particular vehicle or conveyance or mode of propulsion.

Figure 1:
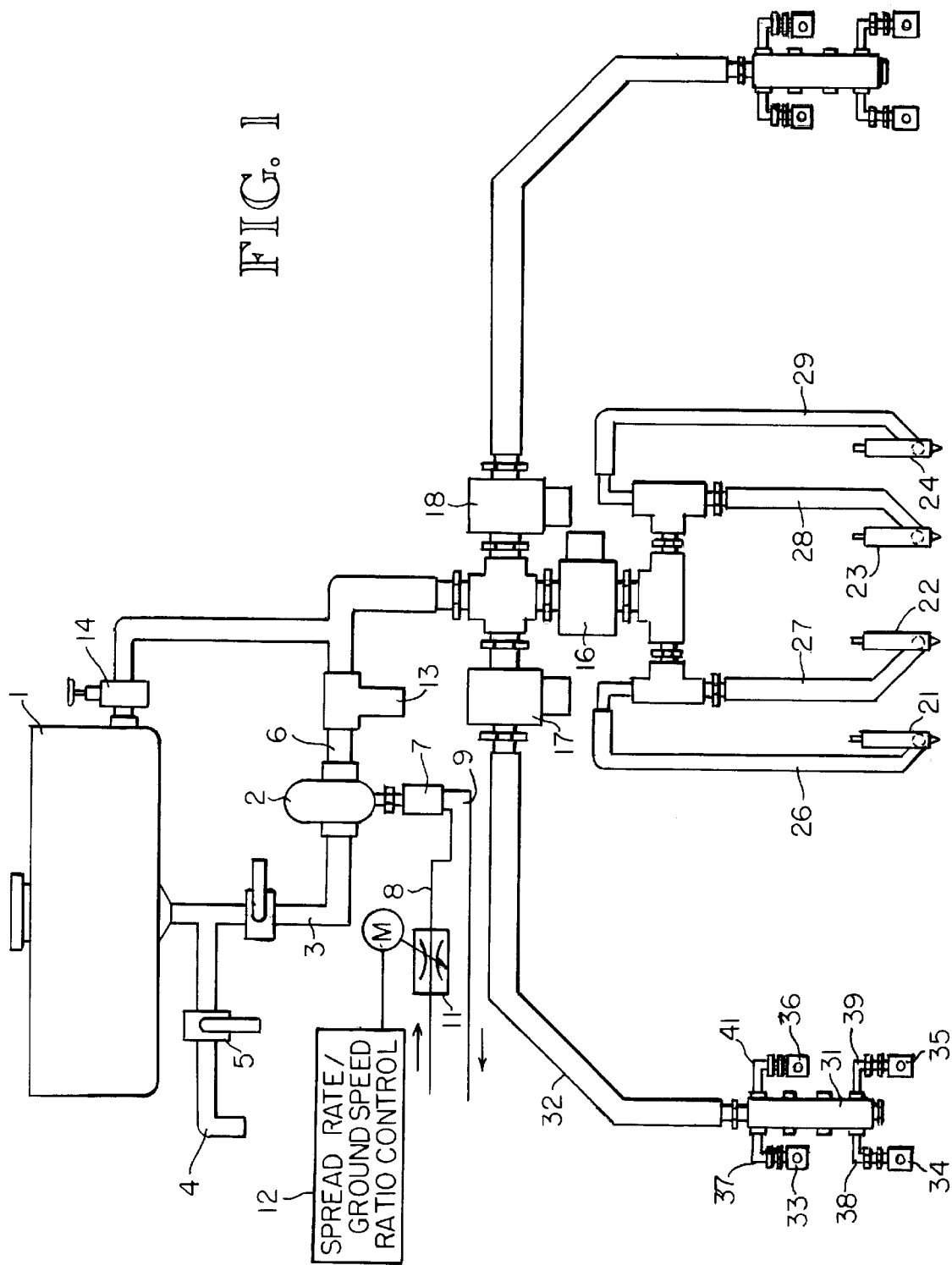
FIG. 1 is diagrammatical plan view of the speed compensated liquid spray system.

Referring to FIG. 1, the fluid system for dispensing the liquid product is illustrated as including both center lane spray nozzles and right and left hand lane spray nozzle applications. Although the illustrated embodiment includes four spray nozzles per lane to be sprayed, this arrangement is by way of example only and is not meant to be a limiting factor. Either a greater or fewer number of nozzles can be utilized within the concepts of the present invention.

A supply of the liquid product to be sprayed is contained in the product tank 1 which feeds the positive displacement gear pump 2 via the tubing 3 with a tank drain 4 being provided to selectively drain the tank in a conventional manner. The manual shut-off valves 5 may be used for this purpose. As will be presently described, the tank 1 and sprayer apparatus will be mounted on a truck or other conveyance for movement on the surface or adjacent the area to be sprayed.

The pump 2 delivers liquid product to the main supply line 6 at a pressure and flow rate dependent upon the speed with which the pump is driven in a conventional manner. In the present illustrated embodiment, the pump 2 is driven by a variable speed hydraulic motor 7 which is connected to a hydraulic supply pump, not shown, via the supply and return lines 8 and 9 respectively. The hydraulic pump for supplying the hydraulic motor 7 may be part of the conventional system provided on a vehicle for the operation of various hydraulic controls or may be installed specifically for the operation of the sprayer apparatus. The pump may be operated by a take-off from the vehicle engine or by any means such as an independent power source. In order to control the amount of hydraulic motor fluid supplied to the motor 7, a servo valve 11 is located in the supply line 8 and may be operated by any known spread-rate/ground-speed ratio control apparatus 12 which is conventional in the art. As illustrated by the prior art discussed above, such spread-rate/ground-speed ratio control apparatus may be either electronic, mechanical, hydraulic or a combination of these and more recently programmable data processing controls are available for maintaining a preset ratio between the vehicle ground speed and the speed of a hydraulic motor such as the motor 7. It is also possible to power the pump 2 by other drive means such as hydraulic pressure and flow compensated variable displacement systems, fixed displacement systems, hydrostatic transmission systems and gas or diesel engine driven systems to mention only a few. Details of the drive means 7 and spread-rate/ground-speed ratio controls form no part of the present invention, the only requirement being to drive the pump means 2 to drive the pump at a rate which corresponds to the rate of forward movement of the vehicle so as to correlate the volume and pressure of the fluid in product delivery line 6 to the vehicle speed.

As illustrated in FIG. 1, the deliver line 6 may be equipped with a filter or strainer 13 to protect the spray nozzles and a pressure relief valve 14 to limit the fluid pressure in the line 6 to a predetermined maximum. It will also be understood that the liquid spray apparatus to be described may be used to spray virtually any liquid product for any desired application and the fluid lines described may comprise either rigid tubing or flexible hoses as is commonly understood in the art.

FIG. 1 illustrates a liquid delivery system for supplying the liquid product to a center lane set of nozzles controlled by a center lane valve 16, a left lane control valve 17 and a right lane control valve 18. These valves may be shut-off valves such as electrically controlled ball valves. In the preferred embodiment illustrated, the center lane shut-off valve controls a supply of fluid product to the four center lane nozzles 21–24 through the associated supply tubes 26–29.

The right and left hand spray head units may be identical and only the left lane configuration will be described in detail. The shut-off valve 17 controls the flow of liquid product to the manifold 31 via the supply hose 32 to service four spray nozzles 33–36 which are connected to the manifold 31 via the supply tubes 37, 38, 39 and 41 respectively. It will also be understood that the nozzles 32–36 may be identical to the center lane nozzles 21–24. Although these various nozzles may differ in size and number of nozzles per lane, the construction and mode of operation is identical.

Figure 2:
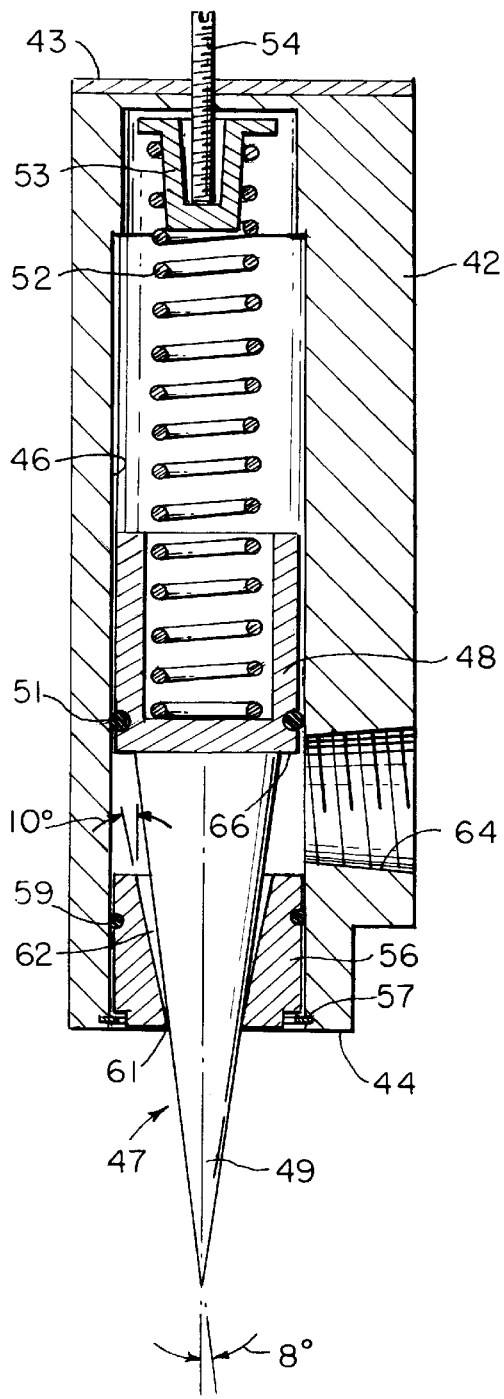
FIG. 2 is a partly sectioned elevational view of the variable orifice nozzle.

FIG. 2 illustrates the novel variable orifice nozzle used in the spray apparatus of the present invention. As seen in FIG. 2, the variable orifice nozzle comprises a cylindrical nozzle body 42 having a closed end 43 and opposite open end 44 for mounting an orifice element. The cylindrical nozzle body is preferably constructed from a high density plastic commercially available as Derlin® so as to be lightweight and non-corrosive. The nozzle body includes a longitudinal central bore 46 for mounting a needle valve element indicated generally at 47 which includes a cylindrical piston head 48 and a conical needle element 49 which may be integral therewith. The piston 48 is sized so as to be reciprocally mounted within the bore 46 and may be sealed therewith by such means as the o-ring seal 51. The needle valve 47 is biased downwardly as viewed in FIG. 2 by means of the compression spring 52 which seats within the piston element 48. An end cap 53 engages the top end of the spring 52 and seats against the adjustable screw member 54 threaded into the closed end 43 of the nozzle body. In this manner, the bias of the spring 52 may be adjusted to set the nozzle opening pressure and to control the operating pressure and fluid flow, which will be equalized for all nozzles, during the spraying operation.

A cylindrical orifice element 56 is mounted in the lower end 44 of the nozzle body and is retained therein by means of a snap ring 57 at its lower end. The nozzle body is, of course, subject to the fluid pressure which maintains it against movement in the opposite direction. The orifice element 56 is sealed within the nozzle body by means of the o-ring 59 and has a circular opening or orifice 61 in its lower end. A tapered bore in the orifice element provides a conical seat 62 which receives the conical needle element 49. The lower end of the needle element protrudes through and beyond the orifice 61 with its apex 63 located outside of the nozzle body. The orifice element 56 may be fabricated from such material as Teflon® and has its bore tapered at an approximate 10 degree angle with its longitudinal axis. The needle element 49 is constructed of a dissimilar material such as Derlin® and is tapered at an approximate 8 degree angle with its longitudinal axis. With this construction, an anti-drip nozzle is provided when the needle element 49 is at its fully throttled position shown in FIG. 2. The needle element is non-sticking because of the dissimilar materials, avoiding surface cohesion between the needle and the conical seat 62.

The nozzle body 42 is connected to the liquid product pressure line through a fitting 64 such that the line pressure acts not only against the bottom face 66 of the piston element 48 but also against the exposed conical surface of the needle 49 with a longitudinal component assisting in unseating the orifice valve. As the piston element 48 moves upwardly against the spring bias, as seen in FIG. 2, the area of the conical surface exposed to the line pressure also increases. In this manner, the line pressure serves, with increasing effect, to unseat the throttle valve needle 49 against the adjustable bias of the spring 52. The size of the annular orifice opening 61 around the bottom end of the needle element 49 is thus increased or decreased depending upon the line pressure at the fitting 64. The line pressure, of course, varies according to the output of the pump 2 which is driven by the variable speed hydraulic motor 7. Depending on the adjustment of the bias of the spring 52, by means of the screw threaded element 54, the size of the discharge orifice is thus controlled to increase the velocity and volume of the product delivered as a function of ground speed. In addition, the fluid exiting the annular orifice opening follows the funnel shaped passage formed between the conical needle 49 and the orifice element resulting in a solid steam flow from the nozzles. This control enables a uniform discharge of liquid product per lineal distance travelled regardless of the speed of the vehicle. In order to be able to project a solid stream of liquid and to be able to positively direct the application of the stream to the road surface, the nozzle velocity of the liquid discharged is maintained either equal to or greater than the vehicle velocity when spraying in the opposite direction to travel. This relationship is referred to as zero-velocity spraying in the vehicle spraying art. As an operating example, the nozzles for de-icing units have been set to open and start spraying at 20 psi by proper adjustment of the spring bias on the needle valve 49. The orifice is then at full flow at 40 psi. The flow rate at 20 psi is 0.1 gallons per minute and the flow rate at 40 psi is 20 gallons per minute. Thus with the variable orifice the user can operate from zero to 60 miles per hour and set in any spread rate from 20–100 gallons per lane mile without the need to change nozzles.

Figure 3:
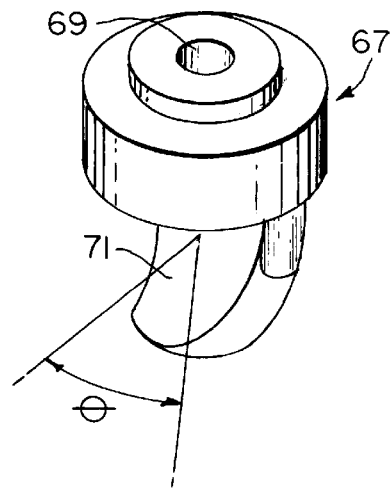
FIG. 3 is a perspective view of a nozzle spray deflector.
Figure 4:
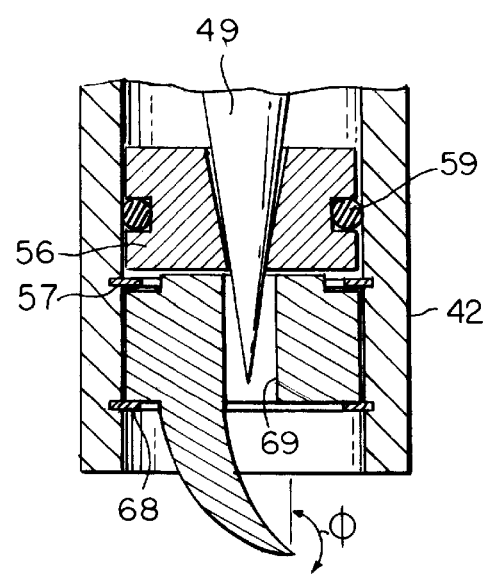
FIG. 4 is a partially sectioned view showing the placement of the spray deflector of FIG. 3.

In some instances, it may be desirable to widen the spray angle of the discharged liquid while still maintaining a solid stream flow from the orifice. For this purpose, a nozzle deflector 67, shown in FIG. 3, may be mounted below the orifice element 56 as illustrated in detail in FIG. 4. The deflector 67 is retained within the nozzle body by means such as a snap ring 68 and includes a central bore 69 receiving the end of the needle element 49 as illustrated. The deflector 67 is provided with a dished surface 71 which is transversely and longitudinally curved so as to control both the spread angle $\theta$ and the angle of elevation $\phi$ of the solid stream flowing from the end of the needle 49.

Figure 5:
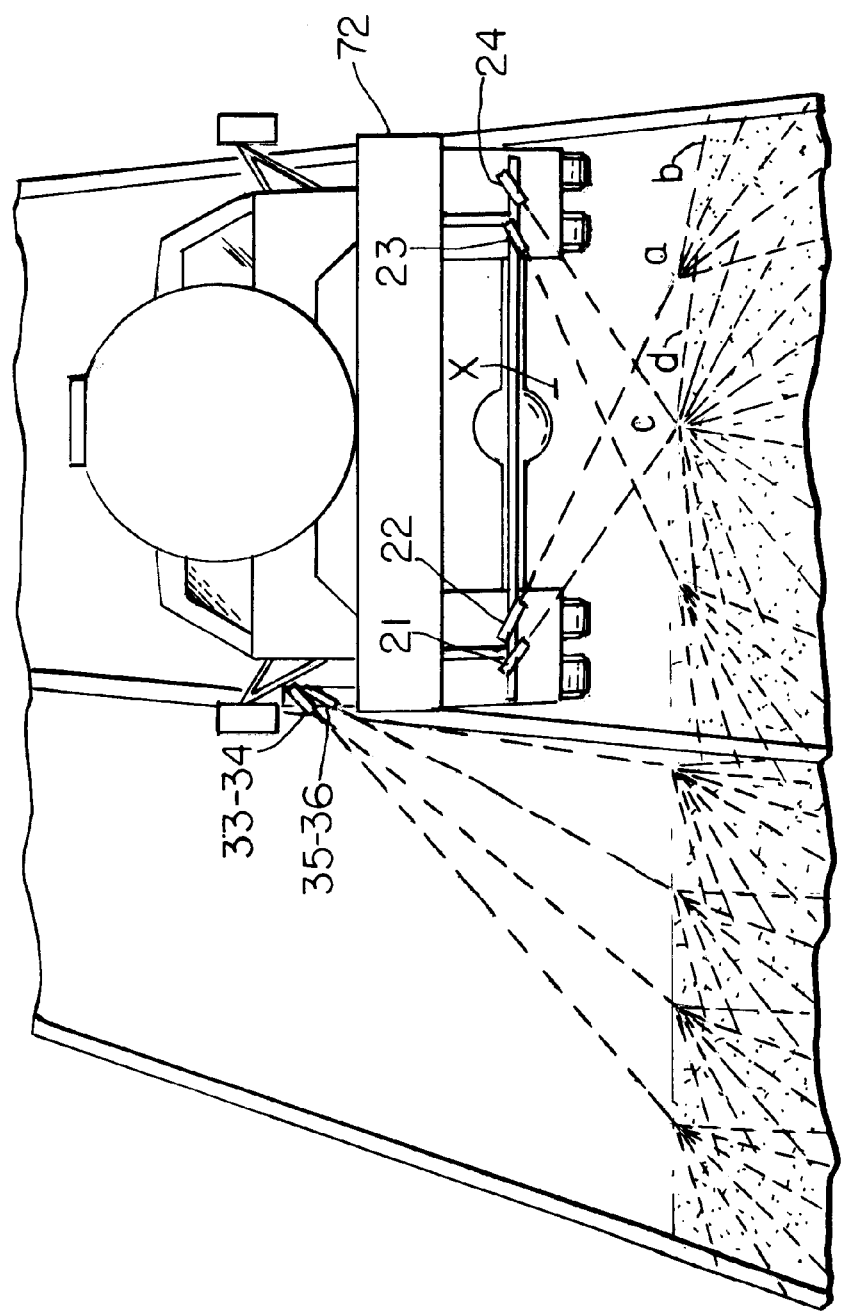
FIG. 5 is a rear schematic of a vehicle with spray nozzles mounted according to the present invention for two lane spraying.

FIG. 5 is a schematic view of a spray vehicle provided with a spray apparatus of the present invention designed to spray both standard 12 foot lanes of a typical 2 lane highway. The arrangement depicted is suitable for de-icing/anti-icing spray wherein a compound such as magnesium chloride is sprayed directly to the surface of the highway from standstill to the maximum road speeds. The truck bed indicated generally at 72 is designed to carry the product tank of de-icing liquid 1 with the center lane nozzles 21 and 22 being mounted on one side of the rear end of the bed and the two remaining center lane nozzles 23 and 24 being mounted on the opposite side of the bed. As previously mentioned the number of nozzles used in any specific application is optimal and may be chosen according to the results desired. The four nozzle configuration is shown by way of example only.

It will be noted that the nozzles 21 and 22 are aimed so as to project the solid stream of liquid de-icer not only rearwardly beyond the turbulent air zone indicated at x, immediately behind the moving truck, but also at a cross lane angle relative to the direction of forward travel of the vehicle. The solid stream spray from the nozzle 22 strikes the pavement at point a and wets a predetermined generally linear splash zone b extending substantially ¼ the lane width. Simultaneously, the solid stream spray from the nozzle 21 strikes the pavement at point c and wets a generally linear splash zone d the remaining half of the lane. In a similar manner, the nozzles 23 and 24 direct solid streams rearwardly beyond the turbulent zone x behind the truck bed at a cross lane angle with the solid streams striking the pavement to wet corresponding splash zones on the other half of the center lane. As will be understood, as the vehicle moves forward four continuous ribbons of wetting are laid down to cover the entire lane behind the truck. In this regard, since the projected streams would otherwise intersect, one pair of nozzles 21 and 22 are elevated slightly above the other pair of nozzles 23 and 24 on the opposite side of the truck bed. Because of the zero-velocity spraying method and the use of solid stream spraying the jets of liquid may be projected positively and accurately to insure that the de-icing liquid is applied at the exact desired location. Because the spray jets are projected behind the end of the moving truck, any interference caused by the turbulent air zone immediately behind the truck bed is obviated.

As also seen in FIG. 5, the adjacent lane may be simultaneously completely covered by similar spray patterns by means of the left lane spray nozzles, 33–36. The nozzles may be mounted in any desired manner which will allow them to be aimed and clamped in place to obtain the desired spray pattern. The solid liquid stream from the left lane spray nozzles are directed rearwardly and outwardly to obtain a splash zone which, when simultaneously applied produce four ribbons of covered area which extend completely across the 12 foot lane of traffic. It will be noted that the type of solid stream spraying described avoids any atomization of the liquid product and any resulting mist from the spray product which can become a road hazard or may otherwise be picked up on the windshields of vehicles following the spraying operation.

Figure 6:
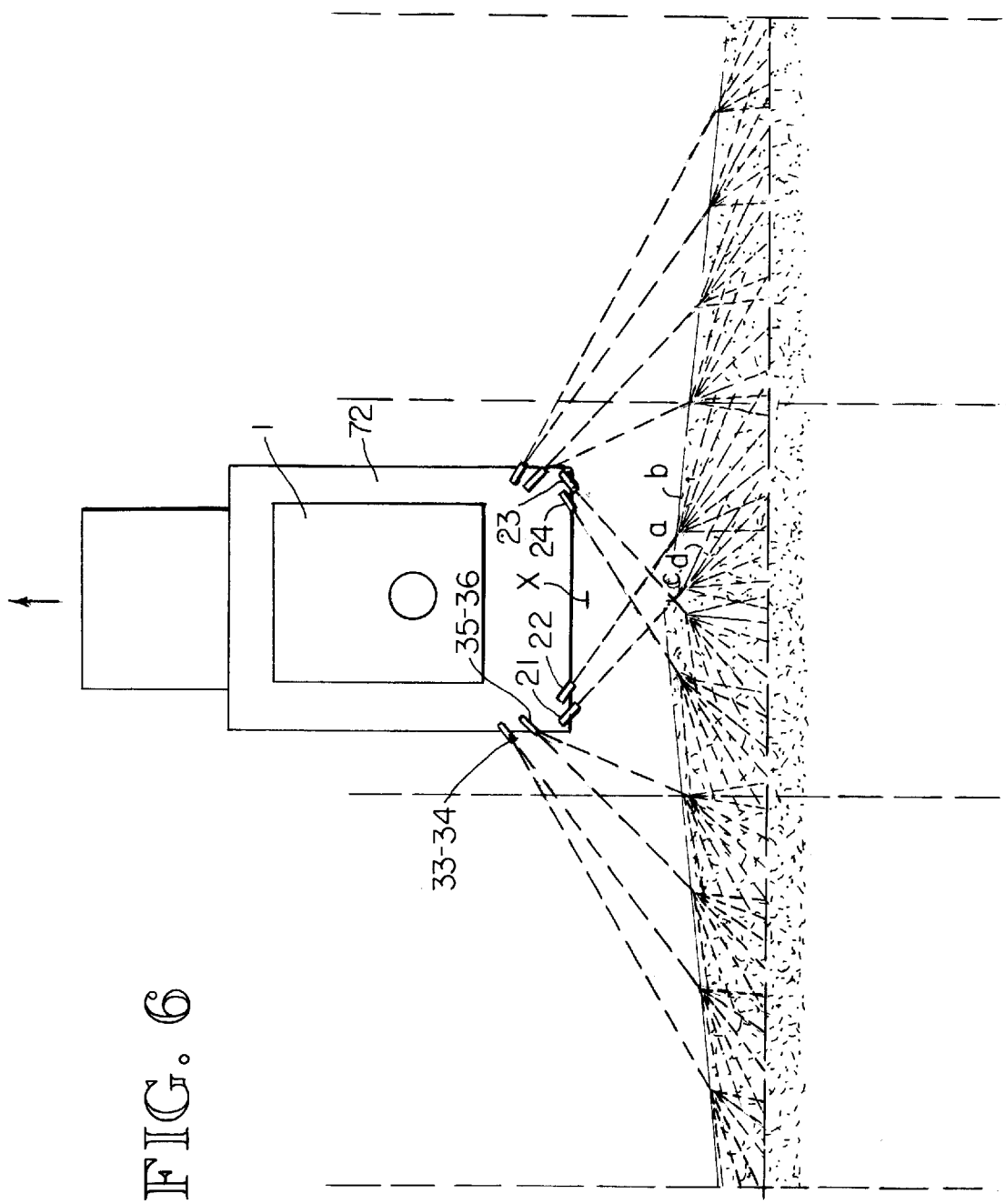
FIG. 6 is a top plan view schematic of a vehicle with spray nozzles mounted according to the present invention for three lane spraying.

FIG. 6 is a diagrammatic plan view showing the same vehicle 72 fitted with both right and left hand lane spraying nozzles which enable the vehicle to cover three standard 12 foot highway lanes. It will be understood that the method of application of the solid stream liquid sprays in FIG. 6 is the same as that described for the two lane spraying arrangement of FIG. 5.

From the foregoing it will be appreciated that the present invention not only provides a novel variable orifice nozzle arrangement for a vehicle mounted spray apparatus but also provides a method of solid stream spraying at zero-velocity in a novel spray pattern which avoids the effect of forward movement of the vehicle and any air turbulence cause thereby. The solid stream jets may be accurately aimed with the liquid product being applied at the exact predetermined point on the surface of the roadway regardless of ground speed.

It is to be understood that the foregoing description and accompanying drawings have been given by way of illustration and example. It is also to be understood that changes in form of the several parts, substitution of equivalent elements and arrangement of parts which will be readily apparent to one skilled in the art, are contemplated as within the scope of the present invention, which is limited only by the claims which follow.

What is claimed is:

1. A variable orifice solid stream spray nozzle comprising;
    a nozzle body having a bore therein with an orifice at one end and a tapered outlet passage leading thereto,
    a capered needle valve element located in said tapered outlet passage with its apex extending through said orifice and mounted for reciprocation in said bore,
    spring biasing apparatus in said bore for biasing said valve element toward a closed shut-off position in said orifice and limiting movement of said valve element to a fully open position,
    said valve element being of sufficient extent such that the apex thereof extends through said orifice at the fully open position to provide an annular orifice configuration of variable cross sectional area throughout travel of the valve element between the shut-off and fully open positions, and
    an inlet in said body for admitting pressure fluid to act against said valve element to move it away from said orifice against the spring bias,
    whereby an annular opening and discharge passage is formed about the end of said needle valve element to create a solid stream flow of said pressure fluid and the cross sectional area of said annular opening is determined by the pressure of said fluid.

2. The spray nozzle according to claim 1 wherein the surfaces of said outlet passage and said needle valve element comprise right circular conical surfaces, whereby the surface area of said valve element acted upon by said pressure fluid increases as the valve element moves away from said orifice.

3. The spray nozzle according to claim 2 wherein;

the taper angle of the conical surface of the outlet passage is greater than the taper angle of the conical surface of said valve element, whereby the annular discharge passage formed therebetween has a funnel shaped cross section.

4. The spray nozzle of claim 3 wherein;

the conical surfaces of said outlet passage and the valve element are constructed of dissimilar non metallic material, whereby surface cohesion between said valve element and said outlet passage surface is eliminated to form a non stick drip proof valve.

5. The spray nozzle according to claim 1 wherein said spring biasing apparatus comprises;

a spring element acting between said needle valve element and said nozzle body, and a bias adjusting structure connected to said nozzle body for adjusting the bias of said spring element to determine the fluid pressure required to initially open said valve and to move the valve element to the fully open position, whereby the cross sectional area of said annular opening and the discharge fluid pressure of said nozzle is regulated thereby.

6. The spray nozzle according to claim 3 including;

an orifice element mounted in said bore in fluid sealed relation therewith, said orifice element including a cylindrical body with an inside surface and an outside surface, said orifice comprising a circular opening formed in the outside surface and said tapered outlet passage extending from said inside surface and terminating in said circular opening, and means to retain said orifice element within said bore.

7. The spray nozzle of claim 6 wherein;

said orifice element and said valve element are constructed of dissimilar non metallic material, whereby surface cohesion therebetween is eliminated to thereby form a non stick drip proof nozzle valve.

8. The spray nozzle according to claim 6 including;

a spray deflector mounted in said bore adjacent the outside surface of said orifice element, said deflector including a central passage constructed and arranged to recieve the apex of said needle valve element and to receive the solid stream flow of said pressure fluid, said deflector having a dish shaped deflector surface for deflecting and spreading said solid stream flow in both lateral and vertical directions.

9. A pressure responsive variable orifice solid stream spray nozzle comprising;

a nozzle body having an elongated bore including an inlet passage for communication with a source of pressurized fluid spray, an orifice in said nozzle body adjacent said inlet passage and including a tapered outlet passage of diminishing cross section leading thereto, a spring biased needle valve assembly including a piston and an elongated tapered needle valve element mounted for reciprocation in said nozzle body between a shut-off position and a fully open position, said needle valve element extending within said tapered passage with the apex thereof protruding outside said orifice to form a spray discharge passage and being of sufficient extent such that the apex thereof extends through said orifice at the fully open position, said needle valve assembly including surfaces exposed to said pressurized fluid for urging said needle valve element away from said orifice in opposition to said spring bias, whereby said fluid spray is forced through said spray discharge passage and said orifice defines an annular opening formed about the end of said needle valve element throughout its travel to create a solid stream flow, the cross sectional area of said annular opening and said spray discharge passage varying responsive to movement of said valve assembly under influence of the pressurized fluid.

10. The spray nozzle according to claim 9 wherein;

the surfaces of said outlet spray discharge passage and said needle valve element comprise right circular conical surfaces, and the taper angle of the conical surface of the outlet discharge passage is greater than the taper angle of the conical surface of said valve element, whereby the surface area of said valve element acted upon by said pressure fluid increases as the valve element moves away from said orifice and the annular spray discharge passage formed between said valve element and the conical surface of the outlet passage has a funnel shaped cross section.

11. The spray nozzle according to claim 10 wherein; the conical surface of said outlet passage and the valve element are constructed of dissimilar non metallic material, whereby surface cohesion between said valve element and said outlet surface is eliminated to form a non stick, drip proof nozzle valve.

12. The spray nozzle according to claim 9 wherein said spring biased needle valve assembly includes;

a spring element acting between said valve element and said nozzle body, and a bias adjusting structure connected to said nozzle body for adjusting the bias of said spring element to determine the fluid pressure required to initially open said valve and to move the valve element to the fully open position, whereby the cross sectional area of said annular opening and the discharge pressure of said nozzle is regulated thereby.

13. The spray nozzle according to claim 10 including;

an orifice element mounted in said bore in fluid sealed relation therewith, said orifice element including a cylindrical body with an inside and an outside surface, said orifice comprising a circular opening formed in the outside surface and said tapered outlet passage extending from said inside surface and terminating in said circular opening, and means to retain said orifice element within said bore, said orifice element and said valve element being constructed of dissimilar non metallic material, whereby surface cohesion between the orifice element and the valve element is eliminated to form a non stick, drip proof nozzle valve.

14. The spray nozzle according to claim 13 including;

a spray deflector mounted in said bore adjacent the outside surface of said orifice element, said deflector includes a central passage constructed and arranged to receive the apex of said needle valve element and the solid stream flow of said pressure fluid, said deflector having a dish shaped deflector surface for deflecting and spreading said solid stream flow in both lateral and vertical directions.

15. In combination with a mobile vehicle mounted spray system including a pump for supplying a source of pressurized fluid spray product, control means for maintaining the output of said pump in a given settable ratio to the ground speed of said vehicle, a pressure responsive variable orifice spray nozzle for dispensing said spray product comprising;

a nozzle body having a bore therein with an orifice at one end and a tapered outlet passage leading thereto, a tapered needle valve element located in said tapered outlet passage with its apex extending through said orifice and mounted for reciprocation in said bore between a closed shut-off position and a fully open position, spring biasing apparatus in said bore for biasing said valve element toward the closed position in said orifice and limiting movement of said valve element to a fully open position, said valve element being of sufficient extent such that the apex thereof extends through said orifice at the fully open position to provide an annular orifice configuration of variable cross sectional area throughout travel of the valve element between the shut-off and fully open positions, and an inlet in said body connected to said source of pressurized fluid spray product, said pressurized fluid acting against said valve element to move it away from said orifice against the spring bias, whereby an annular opening is formed about the end of said needle to create a solid stream flow of said pressure fluid and the cross sectional area of said annular opening is determined by the pressure of said fluid.

16. The combination according to claim 15 wherein;

the surface of said outlet passage and said needle valve element comprise right circular cylindrical surfaces, whereby the surface area of said valve element acted upon by said pressure fluid increases as the valve element moves away from said orifice.

17. The combination according to claim 16 wherein;

the taper angle of the conical surface of the outlet passage is greater than the taper angle of the conical surface of said valve element, whereby the annular discharge passage formed therebetween has a funnel shaped cross section.

18. A method of applying a uniform volume and spray pattern from a moving vehicle comprising the steps of;

correlating the output supply of a pressurized fluid spray product with the vehicle speed, dispensing said pressurized spray product through a nozzle having a variable orifice size controlled by the pressure of the fluid spray, forming a solid stream of said product dispensed by said nozzle in a direction generally opposite to the direction of travel of said vehicle, and controlling the nozzle discharge velocity of the dispensed product to be equal to or greater than the speed of the vehicle.

19. The method of claim 18 including the step of;

projecting said solid stream of product rearwardly of said vehicle beyond the area of air turbulence caused by forward movement of the vehicle.

20. The method of claim 19 including the step of;

delivering said solid stream of product toward the surface traveled at an angle to the direction of travel of said vehicle.

21. The method of claim 20 including the step of;

delivering a plurality of said solid streams to cover a contiguous spray pattern on the surface traveled by said vehicle.

22. The method of claim 18 wherein said orifice has an annular configuration to form said solid stream, and including the step of;

controlling the cross sectional area of said annular orifice with biasing apparatus responsive to the fluid pressure of the spray product whereby said orifice cross sectional area is increased as the output supply of product is increased.

23. The method of claim 22 including the step of;

adjusting the bias of said biasing apparatus to determine the fluid pressure required to initiate flow through said orifice and to increase the orifice cross sectional area responsive to the fluid pressure of said product to a maximum over said vehicle speed range.

24. The method of claim 23 including the step of;

adjusting said biasing apparatus such that product flow is initiated at 20 psi with a flow rate of 0.1 gallons per minute and the orifice is at full open position at 40 psi with a flow rate of 20 gallons per minute and a vehicle speed of 60 miles per hour.

25. A method of dispensing a pressurized fluid spray product at a uniform spread rate from a moving vehicle throughout a given vehicle speed range comprising;

correlating the output supply volume of the spray product with the vehicle speed, dispensing said spray product through an orifice having an annular configuration to form a solid stream, controlling the cross sectional area of said annular orifice with biasing apparatus responsive to the fluid pressure of the spray product, whereby said orifice cross sectional area is increased as the output supply of spray product is increased.

26. The method of claim 25 including the step of;

adjusting the bias of said biasing apparatus to determine the fluid pressure required to initiate flow through said orifice and to increase the orifice cross sectional area responsive to the fluid pressure of said product to a maximum over said vehicle speed range.

27. The method of claim 26 including the step of;

projecting said solid stream of product rearwardly of said vehicle beyond the area of air turbulence caused by forward movement of the vehicle.

28. The method of claim 27 including the step of;

delivering said solid stream of product toward the surface traveled at an angle to the direction of travel of said vehicle.

29. The method according to claim 28 including the step of;

adjusting said biasing apparatus such that product flow is initiated at 20 psi with a flow rate of 0.1 gallons per minute and the orifice is at full open position at 40 psi with a flow rate of 20 gallons per minute and a vehicle speed of 60 miles per hour.

30. The spray nozzle according to claim 5 wherein said spring element comprises a compression spring and said bias adjusting structure includes a screw threaded pressure adjustment element acting between said compression spring and said nozzle body.

31. The spray nozzle according to claim 12 wherein said spring element comprises a compression spring and said bias adjusting structure includes a screw threaded pressure adjustment element acting between said compression spring and said nozzle body.

32. The combination according to claim 15 wherein said spring biasing apparatus comprises;

a spring element acting between said valve element and said nozzle body, and a bias adjusting structure connected to said nozzle body for adjusting the bias of said spring element to determine the fluid pressure required to initially open said valve and to move the valve element to the fully open position, whereby the cross sectional area of said annular orifice and the discharge fluid pressure of said nozzle is regulated thereby.

33. The combination according to claim 32 wherein said spring element comprises a compression spring and said bias adjusting structure includes a screw threaded pressure adjustment element acting between said compression spring and said nozzle body.

34. In a mobile vehicle mounted spray system, apparatus for applying a uniform volume and spray pattern from the moving vehicle comprising in combination;

pumping apparatus for supplying a pressurized fluid spray product at a volumetric rate correlated with the vehicle speed, a nozzle assembly for dispensing said pressurized spray product through an orifice configured to produce a solid stream of said product in a direction generally opposite to the direction of travel of said vehicle, biasing apparatus in said nozzle assembly for varying the cross sectional area of said orifice between a closed condition and a maximum cross sectional area responsive to the fluid pressure of said product, and bias adjustment apparatus for determining the fluid pressure required to initiate flow through said orifice and for limiting the maximum cross sectional area thereof to produce a nozzle discharge velocity of said product equal to or greater than the speed of the vehicle over a given range of vehicle speed.

35. The combination according to claim 34 including;

nozzle mounting apparatus for adjusting said nozzle assembly to direct said solid stream at an angle to the direction of travel of said vehicle.

36. The combination according to claim 35 including mounting apparatus for mounting a plurality of said nozzle assemblies on said vehicle for directing a plurality of said solid stream onto the surface traveled to produce a predetermined contiguous spray pattern thereon.

* * * * *